United States Patent
Shlens et al.

(10) Patent No.: US 9,852,363 B1
(45) Date of Patent: *Dec. 26, 2017

(54) GENERATING LABELED IMAGES

(71) Applicant: Google Inc., Mountain View, CA (US)

(72) Inventors: Jonathon Shlens, San Francisco, CA (US); Quoc V. Le, Mountain View, CA (US); Gregory Sean Corrado, San Francisco, CA (US); Marc'Aurelio Ranzato, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/987,955

(22) Filed: Jan. 5, 2016

Related U.S. Application Data

(63) Continuation of application No. 13/803,642, filed on Mar. 14, 2013, now Pat. No. 9,256,807.

(60) Provisional application No. 61/706,476, filed on Sep. 27, 2012.

(51) Int. Cl.
*G06K 9/62* (2006.01)
*G06F 17/30* (2006.01)

(52) U.S. Cl.
CPC ....... *G06K 9/627* (2013.01); *G06F 17/30247* (2013.01); *G06K 9/6215* (2013.01)

(58) Field of Classification Search
CPC .......... G06F 17/30843; G06F 17/3079; G06F 17/30268; G06F 17/30244; G06F 17/30781; G06F 17/30247; G06K 9/6255; G06K 9/6256
See application file for complete search history.

(56) References Cited

U.S. PATENT DOCUMENTS

| 7,227,893 | B1 | 6/2007 | Srinivasa et al. |
| 8,027,549 | B2* | 9/2011 | Podilchuk ......... G06F 17/30277 382/159 |
| 9,256,807 | B1* | 2/2016 | Shlens .............. G06F 17/30843 |
| 2009/0208106 | A1 | 8/2009 | Dunlop et al. |
| 2009/0245573 | A1* | 10/2009 | Saptharishi ........ G06K 9/00771 382/103 |

OTHER PUBLICATIONS

Alexe et al., "What is an Object?" *IEEE Conference on Computer Vision and Pattern Recognition*, 2010, 8 pages.

(Continued)

*Primary Examiner* — Jon Chang
(74) *Attorney, Agent, or Firm* — Fish & Richardson P.C.

(57) ABSTRACT

Methods, systems, and apparatus, including computer programs encoded on computer storage media, for generating labeled images. One of the methods includes selecting a plurality of candidate videos from videos identified in a response to a search query derived from a label for an object category; selecting one or more initial frames from each of the candidate videos; detecting one or more initial images of objects in the object category in the initial frames; for each initial frame including an initial image of an object in the object category, tracking the object through surrounding frames to identify additional images of the object; and selecting one or more images from the one or more initial images and one or more additional images as database images of objects belonging to the object category.

20 Claims, 4 Drawing Sheets

(56) References Cited

OTHER PUBLICATIONS

Bradski, "The OpenCV Library," Dr. Dobb's the World of Software Development, Nov. 1, 2000, http://www.drdobbs.com/open-source/the-opencv-library/184404319, 7 pages.
Felzenszwalb et al., "Object Detection with Discriminatively Trained Part Based Models," *IEEE Transactions on Pattern Analysis and Machine Intelligence*, Sep. 2010, 32(9), 20 pages.
Huang and LeCun, "Large-scale Learning with svm and convolutional nets for generic object categorization," *Conference on Computer Vision and Patter Recognition*, 2006, 8 pages.
Itti et al., "A Model of Saliency-Based Visual Attention for Rapid Scene Analysis," *IEEE Transactions on Pattern Analysis and Machine Intelligence*, 1998, 20(11):1254-1259.
Kalal et al., "Tracking-Learning-Detection," *IEEE Transactions on Pattern Analysis and Machine Intelligence*, Jan. 2011, 6(1): 14 pages.
Lipton et al. "Objectvideo Forensics: Activity-based Video Indexing and Retrieval for Physical Security Applications." IEE Intelligent Distributed Surveillance Systems, Feb. 23, 2004, pp. 56-60.
Rigau et al., "An Information-Theoretic Framework for Image Complexity," *Computational Aesthetics in Graphics, Visualization and Imaging*, 2005, 8 pages.
Seo and Milanfar, "Visual Saliency for Automatic Target Detection, Boundary Detection, and Image Quality Assessment," *IEEE International Conference on Acoustic Speech and Signal Processing*, 2010, 4 pages.
Serre et al., "Object recognition with features inspired by visual cortex," *Conference on Computer Vision and Pattern Recognition*, 2005, 7 pages.
Viola and James, "Robust Real-time Object Detection," *International Journal of Computer Vision*, 2001.

* cited by examiner

GENERATING LABELED IMAGES

CROSS-REFERENCE TO RELATED APPLICATION

This application is a continuation of U.S. patent application Ser. No. 13/803,642, filed Mar. 14, 2014, which claims the benefit of U.S. Patent Application No. 61/706,476, filed Sep. 27, 2012, the contents of each are incorporated by reference.

BACKGROUND

This specification relates to generating data sets containing many example images for each of several predefined object categories.

Object detectors exist that can identify bounding boxes of pixels that contain an image of an object in an object category, e.g., by being trained on a set of labeled images of objects in the object category. The set of labeled images, however, may need to be generated manually.

SUMMARY

In general, one innovative aspect of the subject matter described in this specification can be embodied in methods that include the actions of selecting a plurality of candidate videos from videos identified in a response to a search query derived from a label for an object category; selecting one or more initial frames from each of the candidate videos; detecting one or more initial images of objects in the object category in the initial frames; for each initial frame including an initial image of an object in the object category, tracking the object through surrounding frames to identify additional images of the object; and selecting one or more images from the one or more initial images and one or more additional images as database images of objects belonging to the object category.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method can further include storing the database images in association with a label for the object category. Detecting an initial image of an object in a particular initial frame can include: selecting a plurality of bounding boxes from the initial frame; selecting an image contained in a particular bounding box of the plurality of bounding boxes as an image of the object.

Selecting the image contained in the particular bounding box of the plurality of bounding boxes as an initial image of the object can include: applying an object detector to each of the plurality of bounding boxes to generate a respective detection score for each of the bounding boxes; and selecting a highest-scoring bounding box of the plurality of bounding boxes as containing an image of the object.

The method can further include determining that the detection score for the highest-scoring bounding box exceeds a detection score threshold value. The method can further include adjusting the detection score threshold value based on a fraction of previously processed initial frames for which the highest-scoring bounding box has been found to satisfy the detection score threshold value. Tracking the object through surrounding frames to identify additional images of the object can include: tracking the object using an object tracker to identify additional bounding boxes; and selecting images contained by one or more of the additional bounding boxes as additional images of the object.

The method can further include using the database images as training data for a particular object detector. The method can further include using the database images as training data for a first learning model that takes an input sequences of frames extracted from videos and predicts other frames in the videos. The method can further include using the database images as training data for a second learning model that identifies context terms for videos or images. The method can further include using the database images as training data for a model of visual saliency. The method can further include generating statistics that identify frequencies of co-occurrences of objects in the candidate videos.

Particular embodiments of the subject matter described in this specification can be implemented so as to realize one or more of the following advantages. For a given object category, a labeled set of images can be generated quickly and without requiring manual labeling of images. Further, the labeled set of images that is generated may be much larger than manually generated labeled sets of images for the object category. Because the labeled set of images is generated from frames of videos, the images can include images in a much wider variety of poses than existing labeled sets of images. By parallelizing operations, large labeled sets of images for multiple object categories can be generated quickly. Additionally, parallelizing operations allows for labeled sets of images to be generated using an arbitrary number of machines.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
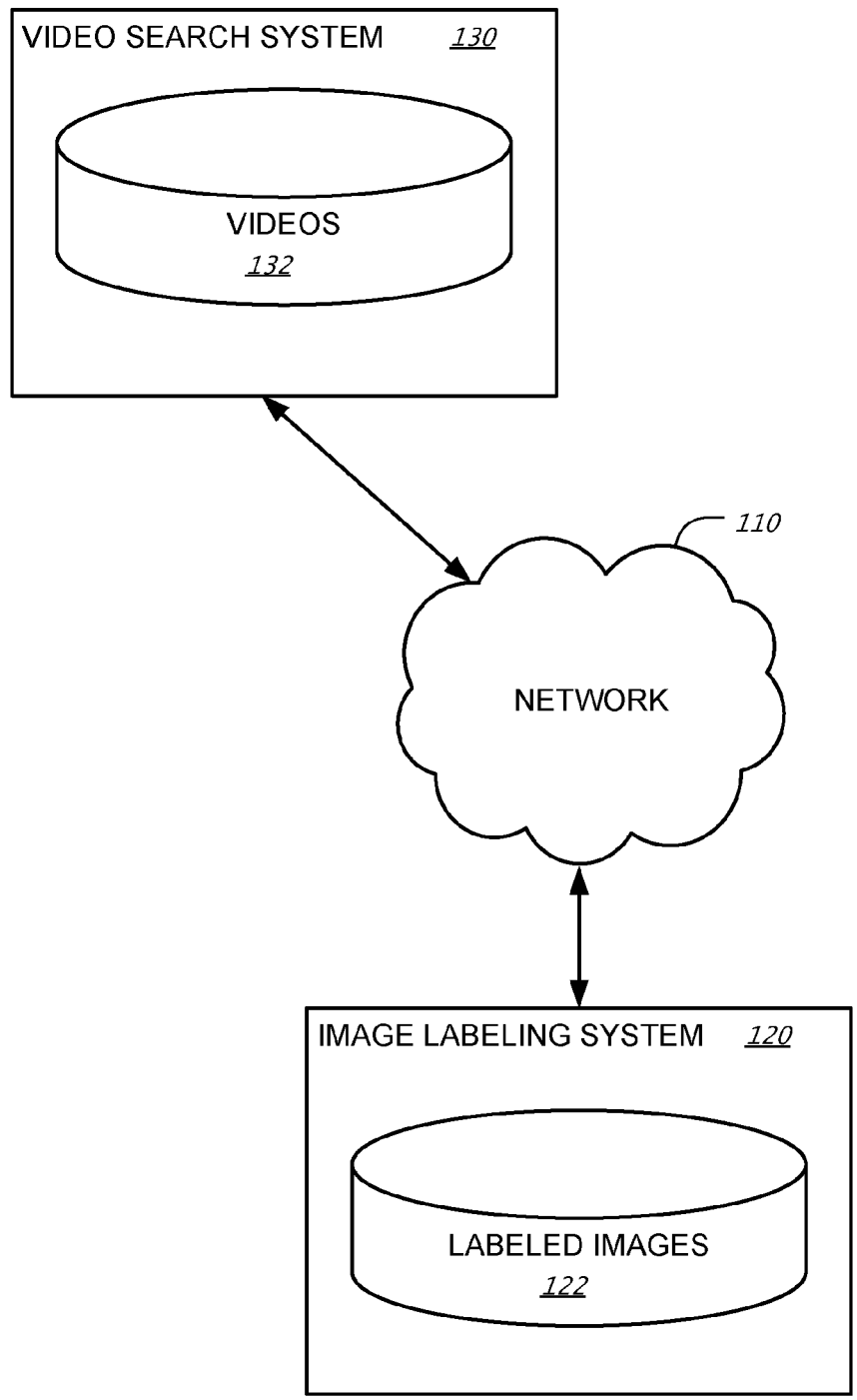
FIG. 1 shows an example image labeling system.

FIG. 1 is a block diagram showing an example image labeling system 120. The image labeling system 120 is an example of a system implemented as computer programs on one or more computers in one or more locations, in which the systems, components, and techniques described below can be implemented.

The image labeling system 120 generates labeled images of objects for one or more object categories and stores the labeled images in a labeled images database 122. A labeled image is an image of an object that is associated with a label for the object category that the object belongs to. For example, if one of the object categories is horses, a labeled image may be an image of a horse that is associated with a label for the category, e.g., "horse." The object categories may be generic, e.g., "horse," or specific, e.g., "George Washington."

In order to generate the labeled images, the image labeling system 120 obtains videos that are likely to contain images of objects in the category. For example, the system can use a video search system 130 for this purpose. The video search system 130 receives search queries and, in response to the search queries, provides video search results that identify videos from a video database 132. The image labeling system 120 can communicate with the video search system 130 through a through a data communication network 110, e.g., local area network (LAN) or wide area network (WAN), e.g., the Internet, or a combination of networks, any of which may include wireless links.

Figure 2:
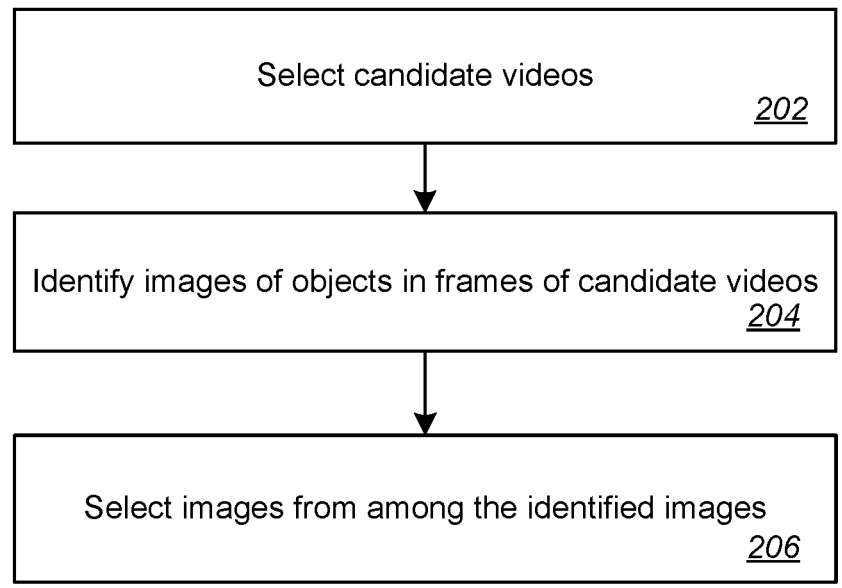
FIG. 2 is a flow diagram of an example process for generating labeled images for an object category.

FIG. 2 is a flow diagram of an example process 200 for generating labeled images for an object category. For convenience, the process 200 will be described as being performed by a system of one or more computers located in one or more locations. For example, an image labeling system, e.g., the image labeling system 120 of FIG. 1, appropriately programmed in accordance with this specification, can perform the process 200.

The process 200 can be performed for each of multiple predetermined object categories. In some implementations, the system performs the process 200 in parallel for multiple different object categories.

The system selects candidate videos (step 202). In order to select the candidate videos, the system submits a search query derived from a label for the object category to a video search engine, e.g., the video search engine 130 of FIG. 1. In response, the system obtains search results that identify videos matching the search query. That is, the video search system receives the search query and provides video search results that identify videos from a video database, e.g., the video database 132 of FIG. 1. Generally, in response to a search query, the video search system performs a search to identify videos from the video database that match the query. The video search system generates video search results that each identify a respective video from the video database and ranks the search results, i.e., places the search results in an order, e.g., according to respective scores for the videos identified by the video search results. In other implementations, the video search system identifies videos stored publicly, e.g., on video hosts accessible through the Internet.

In some implementations, the system generates one or more additional search queries, each derived from a term that relates to the category label, and obtains video search results for each of the queries. For example, for the horse category, the label may be "horse," and related terms may include "mare", "stallion", or "dressage." The system may then merge the results from these queries before selecting the candidate videos. The system can merge the results in any of a variety of ways. For example, the results can be merged to include any result that was provided for at least one query. As another example, the results can be merged so as to include any results having scores exceeding a high threshold. As another example, the results can be merged so as to include only results that were provided in response to two or more queries. As another example, the results can be merged so as to provide a predetermined number of different highest scoring videos.

The system selects the candidate videos from the videos identified by the obtained search results. For example, the system can select as candidate videos, e.g., the videos that are identified by a threshold number of highest-ranked video results or each video that has been assigned a score that exceeds a threshold score.

The system, or the video search system, optionally filters the identified videos to remove videos that are pornographic. Internet search engines and video search engines generally include components that detect and filter out pornographic material; any such components would be suitable for present purposes. Additionally, in some cases, the video search engine may include a component that determines the complexity of videos. In these cases, the system, or the video search system, optionally filters out those identified videos that have determined complexities that indicate that the videos are only slideshows of images.

The system identifies images of objects in frames of the candidate videos (step 204). In particular, the system identifies the images by detecting images of objects in initial frames of the candidate videos and then tracking those objects through surrounding frames of the candidate videos. Identifying images of objects in frames of candidate videos is described in more detail below with reference to FIGS. 3 and 4.

The system selects images from among the identified images (step 206) and stores the selected images as labeled images in a labeled image database, e.g., the labeled image database 122 of FIG. 1. That is, the system stores the selected images in association with a label that identifies the object category. The system may determine which identified images to select in any of a variety of ways. For example, the system may select each identified image. As another example, the system may select only a regularly spaced subset of the identified images from a given candidate video, e.g., every tenth or twentieth identified image from each candidate video. As another example, the system may select only identified images having a quality metric that exceeds a threshold value. The quality metric may be, e.g., a score generated by an object detector or an object tracker, as described below with reference to FIGS. 3 and 4.

Figure 3:
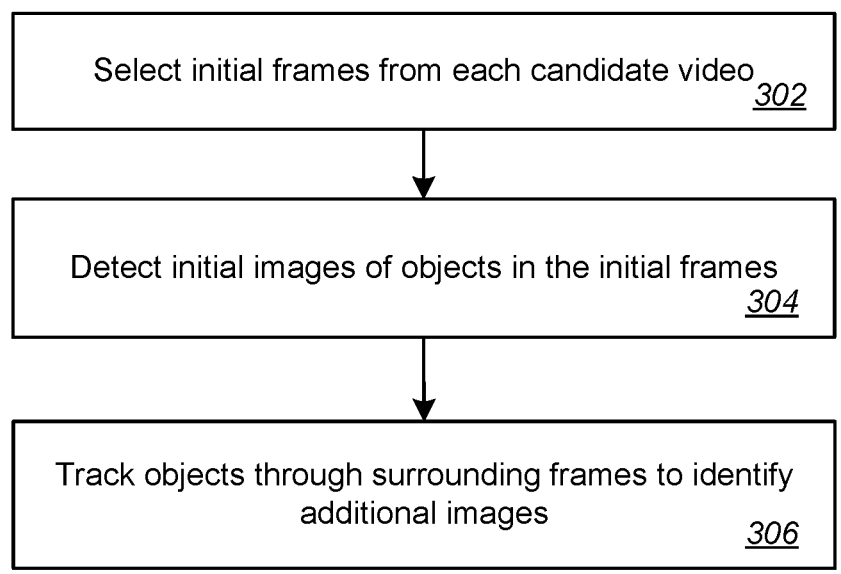
FIG. 3 is a flow diagram of an example process for identifying images of objects in candidate videos.

FIG. 3 is a flow diagram of an example process 300 for identifying images of objects in candidate videos. For convenience, the process 300 will be described as being performed by a system of one or more computers located in one or more locations. For example, an image labeling system, e.g., the image labeling system 120 of FIG. 1, appropriately programmed in accordance with this specification, can perform the process 300.

The system selects initial frames from each candidate video (step 302). For a given candidate video, the system can select the initial frames in any of a variety of ways. For example, the system can select a specified number of initial frames at random from the frames in the candidate video. As another example, the system may select the initial frames from a specified portion of the video, at specified time intervals within the candidate video, or both. As another example, the system may select a frame from the candidate video as an initial frame only if the frame satisfies one or more measures of visual saliency or image complexity. A measure of visual saliency that may be used is described in Seo and Milanfar, *Visual Saliency for Automatic Target Detection, Boundary Detection, and Image Quality Assessment, IEEE International Conference on Acoustics Speech and Signal Processing*, 2010. Another measure of visual saliency that may be used is described in Itti, Koch, and Niebur, *A Model of Saliency-Based Visual Attention for*

Rapid Scene Analysis, IEEE Transactions on Pattern Analysis and Machine Intelligence, 1998. A measure of image complexity that may be used is described in Rigau, Feixas, and Sbert, *An Information-Theoretic Framework for Image Complexity, Computational Aesthetics in Graphics, Visualization and Imaging,* 2005. As another example, the video search engine may provide, for one or more of the candidate videos, data that classifies particular frames from the candidate videos as representative frames. For example, the video search engine may classify as representative frames one or more frames from which thumbnail images for the video may be generated. In these cases, the system can select all of or a portion of these representative frames as initial frames.

The system detects initial images of objects in the object category in the initial frames (step 304). The system may detect the initial images using a conventional object detector that detects objects in the object category in images. For example, the conventional object detector may output, for a given region of an image, i.e., a fixed size region of pixels, a score that represents the likelihood that the region contains an image of an object in the object category. An object detector that may be used to detect initial images is described in Felzenszwalb, Girshick, McAllester, and Ramanan, *Object Detection with Discriminatively Trained Part Based Models, IEEE Transactions on Pattern Analysis and Machine Intelligence,* Vol. 32, No. 9, September 2010. Another object detector that may be used to detect initial images is described in Viola and Jones, *Robust Real-time Object Detection, International Journal of Computer Vision,* 2001. Another object detector that may be used to detect initial images is described in Serre, Wolf, and Poggio, *Object recognition with features inspired by visual cortex. Conference on Computer Vision and Pattern Recognition,* 2005. Another object detector that may be used to detect initial images is described in Huang and LeCun. *Large-scale learning with svm and convolutional nets for generic object categorization. Conference on Computer Vision and Pattern Recognition,* 2006.

In order to detect initial images, the system applies the object detector to each of the initial frames to determine if the initial frame includes one or more images of an object in the object category. If a bounding box within the initial frame contains such an image, the system selects the sub-image defined by the bounding box as an initial image of the object. An example method for applying an object detector to an initial candidate frame is described in more detail below with reference to FIG. 4.

The system tracks the objects detected in the initial frames through surrounding frames to identify additional images of objects that belong to the object category (step 306). The system may track the objects through the surrounding frames using a conventional object tracker. The object tracker may be a generic object tracker that tracks objects based on visual similarity or an object tracker that has been trained to track objects that belong to the object category. A software package that includes object tracking features that may be used to scan the surrounding frames is The OpenCV Library, which is described in Bradski, *The OpenCV Library, Dr. Dobb's Journal of Software Tools,* 2000. Another object tracker that may be used to scan the surrounding frames is described in Kalal, Mikolajczyk, and Matas, *Tracking-Learning-Detection, Pattern Analysis and Machine Intelligence,* 2011.

For each initial image detected in an initial frame, the system uses the object tracker to track the object in the initial image through frames that are forward in time, backward in time, or both, from the initial frame. That is, the object tracker can take as an input the position and dimensions of the bounding box in which the object was detected and the initial frame in which the bounding box is located and identify bounding boxes in surrounding frames, e.g., frames that are forward in time or backward in time from the initial frame in the video, that include the object. Depending on the object tracker that is being used, the object tracker may also return a score for each identified bounding box that represents the likelihood that the bounding box includes the object from the initial image. The system can classify the images defined by the bounding boxes returned by the object tracker as additional images of objects in the object category. In some implementations, the system classifies only images in bounding boxes having scores that exceed a threshold score as additional images.

Figure 4:
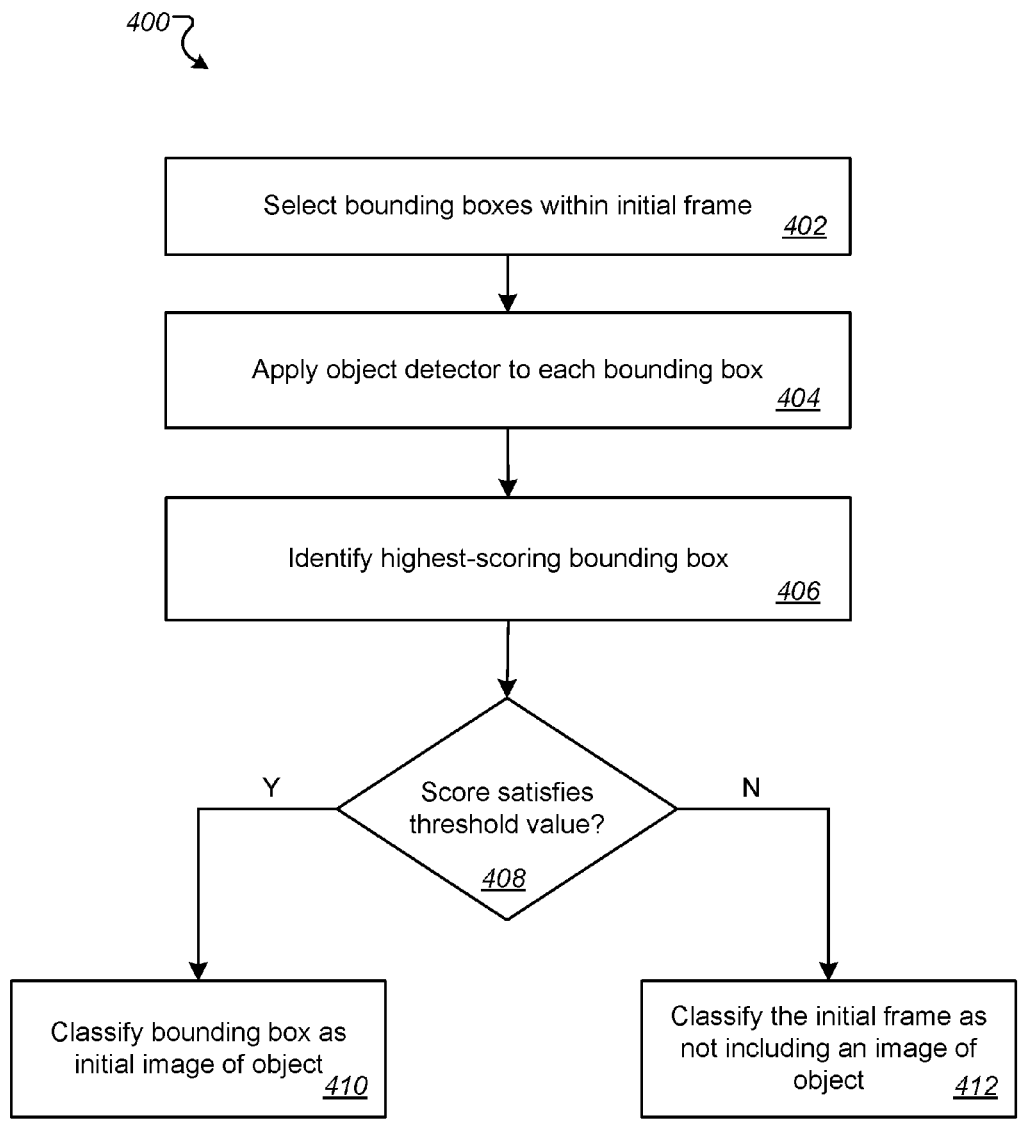
FIG. 4 is a flow diagram of an example process for applying an object detector to an initial frame.

FIG. 4 is a flow diagram of an example process 400 for applying the object detector to an initial frame. For convenience, the process 400 will be described as being performed by a system of one or more computers located in one or more locations. For example, an image labeling system, e.g., the image labeling system 120 of FIG. 1, appropriately programmed in accordance with this specification, can perform the process 400.

The system selects a set of bounding boxes within the initial frame (step 402). The bounding boxes may be square or rectangular. In some implementations, the system selects a range of dimensions for the bounding boxes and applies the bounding box of each size at each possible position in the frame. In other implementations, the system may select the bounding boxes randomly, so that the selected bounding boxes generate a grid that encompasses all of or a desired portion of the initial frame, or based on one or more heuristics. For example, the heuristics may include one or more of image patch complexity, visual saliency, or generic objectness. Generic objectness is described in Alexe, Deselares, and Ferrari, *What is an Object?, IEEE Conference on Computer Vision and Pattern Recognition,* 2010. The system can select the bounding boxes with or without overlap. In some implementations, the system selects bounding boxes of varying sizes, i.e., that contain varying amounts of pixels. In some other implementations, e.g., if the object detector used by the system requires images of a fixed size, the system can select bounding boxes to be the same size, or the system can resize the extracted bounding boxes at all their various scales, e.g., 80×80 pixels, 125×125 pixels, 150×150 pixels, to the fixed size expected by the detector, e.g., 100×100 pixels.

The system applies the object detector to each bounding box to generate a score for each bounding box (step 404) and identifies a highest-scoring bounding box (step 406).

The system determines whether the score of the highest-scoring bounding box satisfies a threshold value (step 408). The threshold value may be constant for each initial frame or may be adjusted from one initial frame to another. For example, the threshold value for a given initial frame may be increased if the fraction of initial frames previously processed by the system for which the highest-scoring bounding box has been found to satisfy the threshold value is above a first threshold fraction. As another example, the threshold value for a given initial frame may be decreased if the fraction of initial frames previously processed by the system for which the highest-scoring bounding box has been found to satisfy the threshold value is below a second threshold fraction.

If the score satisfies the threshold value, the system classifies the image defined by the highest-scoring bounding box as an initial image of an object that belongs to the object category (step 410). Otherwise, the system classifies the initial frame as not including any images of objects that belong to the object category (step 412).

The techniques described above generate a labeled data set of images of objects in a predetermined object category that is stored in a labeled image database. Once the labeled set of images is generated, it can be used for any of a variety of purposes. For example, the labeled data set can be used as training data for an object detector that detects objects in the object category. The object detector can be an object detector that has already been trained on a smaller set of training data or an object detector that has yet to be trained.

As another example, the labeled data set can be used to train a system to learn motion primitives or to predict actions in videos. In general, a set of labels associated with sequences of images in a given video, i.e., sequences of frames from the video that each include images of an object, can be derived from the labeled data set. These sequences of images can be employed by a machine learning system in an unsupervised or supervised training regime. For instance, a system can be trained in a supervised manner to predict the last frame in an image sequence based on the previous frames in the sequence. Likewise, the system can be trained to predict the first or middle frames in a sequence of frames based on the other frames in the sequence. A system can be trained in an unsupervised manner where it receives as input all of the frames in a sequence and is trained to learn the temporal structure of image sequences. As another example, the labeled data set can be used to train a system to associate audio tracks with objects or with object categories. In particular, the sequence of images contains a time stamp for when the sequence of images occurred with respect to the video. By correlating these time stamps with the video from which these images were extracted, a system may be trained that predicts individual audio tracks, also known as "sound objects," for the sequence of images. That is, the system can learn associations of particular sounds with moving objects in video sequence. This training can be supervised or unsupervised.

As another example, the labeled data set can be used to improve topic models associated with videos by using objects as context to learn higher-level concepts. That is, the labeled data set can be used as training data for a system that predicts the context of a video or image, e.g., where the video or image takes place, the time period the video or image takes place, the circumstances in which the video or image takes place, and so on, based on the objects that are identified in the video or image. For example, if, using the labeled images in the labeled data set, it is determined that a given video or image contains an object labeled "dog," an object labeled "cat," and an object labeled "needle," the system may predict that the image takes place at a veterinary hospital. The system may be trained on the labeled data set using a supervised or unsupervised learning procedure. Additionally, once terms that identify the context of the video or image are predicted, these terms can be associated with the video or image. These associated context terms can then be used to improve video search, e.g., by promoting a video that has context terms that match terms from a received search query in video search results for the search query.

As another example, the labeled data set can be used to build a labeled video repository or to de-noise images and videos of objects by building a well-informed prior distribution of how objects in the object category should appear.

As another example, the labeled data set can be used to build a model of visual saliency for filtering videos for interesting items. Example techniques for using labeled data to build a model of visual saliency are described in Itti, Koch, and Niebur, *A Model of Saliency-Based Visual Attention for Rapid Scene Analysis, IEEE Transactions on Pattern Analysis and Machine Intelligence,* 1998.

As another example, the labeled data set can be used to learn associations or correlation between objects in videos to improve video recommendations, e.g., recommendations of other videos that a user viewing a particular video may be interested in. For example, during the generation of the labeled data set, the system can generate statistics that identify the frequency of co-occurrences of two objects in the same video, in the same frame, or both. From these statistics, the system can identify correlations between objects and use those correlations to improve the accuracy of the object detector by leveraging the learned correlations. Additionally, the system can identify videos that include images of objects that are correlated with objects in a video currently being viewed by a user and include those videos in recommendations of videos that the user may be interested in.

As another example, the labeled data set can be used to automatically generate photo albums for particular celebrities, products, or other objects of interest that appear in Internet videos.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of generating labeled images of objects belonging to a particular object category, the method comprising:
   obtaining data identifying the particular object category;
   identifying database images of the objects belonging to the particular object category, comprising:

generating a search query derived from a label for the particular object category;

selecting a plurality of candidate videos from videos identified in response to submission of the search query;

selecting one or more initial frames from each of the candidate videos;

detecting one or more initial images of objects belonging to the particular object category in the one or more initial frames;

for each initial frame including an initial image of an object belonging to the particular object category, tracking the object through surrounding frames to identify one or more additional images of the object; and selecting one or more images from the one or more initial images and one or more additional images as the database images of objects belonging to the particular object category; and storing the database images as images of objects belong to the particular object category.

2. The method of claim 1, wherein storing the database images comprises storing the database images as training data for a machine learning model.

3. The method of claim 2, further comprising:

training, using the training data that includes the database images, the machine learning model to classify particular images in videos as being associated with the object category.

4. The method of claim 2, further comprising:

training, using the training data that includes the database images, the machine learning model to predict a context of images or videos.

5. The method of claim 2, further comprising:

training, using the training data that includes the database images, the machine learning model to receive, as an input, sequences of frames extracted from videos and predict other frames in the videos.

6. The method of claim 1, further comprising:

generating an additional search query derived from terms associated with the label for the particular object category;

identifying one or more videos identified in response to submission of the additional search query; and merging the plurality of candidate videos and the one or more videos identified in response to submission of the additional search query to generate a second plurality of candidate videos.

7. The method of claim 6, wherein merging the plurality of candidate videos and the one or more videos comprises:

determining candidate videos that were included in both (i) the one or more videos identified in response to submission of the additional search query, and (ii) the videos identified in response to submission of the search query; and generating the second plurality of candidate videos by filtering videos from the plurality of candidate videos that were not included in both (i) the one or more videos identified in response to submission of the additional search query, and (ii) the videos identified in response to submission of the search query.

8. The method of claim 1, wherein selecting the one or more images from the one or more initial images and the one or more additional images as the database images of objects belonging to the particular object category comprises:

determining one or more subsets of the one or more initial images in the respective selected candidate video; and selecting subsets of the one or more initial images that (i) are spaced apart from each other by a determined number of images in the respective selected candidate videos, and (ii) satisfy a quality threshold for initial images.

9. The method of claim 1, wherein for each initial frame including the initial image of the object belonging to the particular object category, tracking the object through surrounding frames to identify one or more additional images of the object comprises:

applying an object tracker to a plurality of bounding boxes within the initial frame to track the initial image of the object belonging to the particular object category;

generating scores for the plurality of bounding boxes in response to applying the object tracker;

determining a detection score threshold value based on a fraction of previously-processed initial frames for which the highest-scoring bounding box has been found to satisfy a previous detection score threshold value being above a first threshold fraction; and selecting a particular bounding box of the plurality of bounding boxes having the highest score and satisfying the detection score threshold.

10. A system comprising:

one or more processors and one or more computer storage media storing instructions that are operable and when executed by the one or more processors, cause the one or more processors to perform operations comprising:

obtaining data identifying the particular object category;

identifying database images of the objects belonging to the particular object category, comprising:

generating a search query derived from a label for the particular object category;

selecting a plurality of candidate videos from videos identified in response to submission of the search query;

selecting one or more initial frames from each of the candidate videos;

detecting one or more initial images of objects belonging to the particular object category in the one or more initial frames;

for each initial frame including an initial image of an object belonging to the particular object category, tracking the object through surrounding frames to identify one or more additional images of the object; and selecting one or more images from the one or more initial images and one or more additional images as the database images of objects belonging to the particular object category; and storing the database images as images of objects belong to the particular object category.

11. The system of claim 10, wherein storing the database images comprises storing the database images as training data for a machine learning model.

12. The system of claim 11, wherein the operations further comprise training, using the training data that includes the database images, the machine learning model to:

classify particular images in videos as being associated with the object category;

predict a context of images or videos; or receive, as an input, sequences of frames extracted from videos and predict other frames in the videos.

13. The system of claim 10, wherein the operations further comprise:

generating an additional search query derived from terms associated with the label for the particular object category;

identifying one or more videos identified in response to submission of the additional search query; and merging the plurality of candidate videos and the one or more videos identified in response to submission of the additional search query to generate a second plurality of candidate videos.

14. The system of claim 13, wherein merging the plurality of candidate videos and the one or more videos comprises:

determining candidate videos that were included in both (i) the one or more videos identified in response to submission of the additional search query, and (ii) the videos identified in response to submission of the search query; and generating the second plurality of candidate videos by filtering videos from the plurality of candidate videos that were not included in both (i) the one or more videos identified in response to submission of the additional search query, and (ii) the videos identified in response to submission of the search query.

15. The system of claim 10, wherein selecting the one or more images from the one or more initial images and the one or more additional images as the database images of objects belonging to the particular object category comprises:

determining one or more subsets of the one or more initial images in the respective selected candidate video; and selecting subsets of the one or more initial images that (i) are spaced apart from each other by a determined number of images in the respective selected candidate videos, and (ii) satisfy a quality threshold for initial images.

16. A non-transitory computer-readable storage medium encoded with a computer program, the computer program comprising instructions that, upon execution by a computer, cause the computer to perform operations comprising:

obtaining data identifying the particular object category;

identifying database images of the objects belonging to the particular object category, comprising:

generating a search query derived from a label for the particular object category;

selecting a plurality of candidate videos from videos identified in response to submission of the search query;

selecting one or more initial frames from each of the candidate videos;

detecting one or more initial images of objects belonging to the particular object category in the one or more initial frames;

for each initial frame including an initial image of an object belonging to the particular object category, tracking the object through surrounding frames to identify one or more additional images of the object; and selecting one or more images from the one or more initial images and one or more additional images as the database images of objects belonging to the particular object category; and storing the database images as images of objects belong to the particular object category.

17. The non-transitory computer-readable storage medium of claim 16, wherein storing the database images comprises storing the database images as training data for a machine learning model.

18. The non-transitory computer-readable storage medium of claim 17, wherein the operations further comprise training, using the training data that includes the database images, the machine learning model to:

classify particular images in videos as being associated with the object category;

predict a context of images or videos; or receive, as an input, sequences of frames extracted from videos and predict other frames in the videos.

19. The non-transitory computer-readable storage medium of claim 16, wherein the operations further comprise:

generating an additional search query derived from terms associated with the label for the particular object category;

identifying one or more videos identified in response to submission of the additional search query; and merging the plurality of candidate videos and the one or more videos identified in response to submission of the additional search query to generate a second plurality of candidate videos.

20. The non-transitory computer-readable storage medium of claim 19, wherein merging the plurality of candidate videos and the one or more videos comprises:

determining candidate videos that were included in both (i) the one or more videos identified in response to submission of the additional search query, and (ii) the videos identified in response to submission of the search query; and generating the second plurality of candidate videos by filtering videos from the plurality of candidate videos that were not included in both (i) the one or more videos identified in response to submission of the additional search query, and (ii) the videos identified in response to submission of the search query.

* * * * *